US012705759B2

(12) United States Patent
Larson et al.

(10) Patent No.: US 12,705,759 B2
(45) Date of Patent: Aug. 11, 2026

(54) SELECTIVELY IDENTIFYING DATA BASED ON MOTION DATA FROM A DIGITAL VIDEO TO PROVIDE AS INPUT TO AN IMAGE PROCESSING MODEL

(71) Applicant: Microsoft Technology Licensing, LLC, Redmond, WA (US)

(72) Inventors: Christian Palmer Larson, Kirkland, WA (US); Naveen Thumpudi, Redmond, WA (US); Mehmet Kucukgoz, Seattle, WA (US); Louis-Philippe Bourret, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 686 days.

(21) Appl. No.: 18/070,236

(22) Filed: Nov. 28, 2022

(65) Prior Publication Data

US 2023/0086804 A1 Mar. 23, 2023

Related U.S. Application Data

(62) Division of application No. 16/352,714, filed on Mar. 13, 2019, now Pat. No. 11,514,587.

(51) Int. Cl.
*G06T 7/246* (2017.01)
*G06T 7/215* (2017.01)
(Continued)

(52) U.S. Cl.
CPC .............. *G06T 7/246* (2017.01); *G06T 7/215* (2017.01); *H04N 19/182* (2014.11);
(Continued)

(58) Field of Classification Search
None
See application file for complete search history.

(56) References Cited

U.S. PATENT DOCUMENTS 10,691,925 B2 6/2020 Ng et al.
2006/0109902 A1* 5/2006 Yu .......................... H04N 19/48 348/700

(Continued)

FOREIGN PATENT DOCUMENTS

CN 101223786 A 7/2008
CN 101663676 A 3/2010

(Continued)

OTHER PUBLICATIONS

Huang, Cheng, and Hongmei Wang. "A novel key-frames selection framework for comprehensive video summarization." IEEE Transactions on Circuits and Systems for Video Technology 30.2 (2019): 577-589. (Year: 2019).*

(Continued)

*Primary Examiner* — Sean M Conner
(74) *Attorney, Agent, or Firm* — Klarquist Sparkman, LLP

(57) ABSTRACT

The present disclosure relates to systems, methods, and computer-readable media for selectively identifying pixel data to provide as an input to an image processing model based on motion data associated with the content of a digital video. For example, systems disclosed herein include receiving a compressed digital video and decompressing the compressed digital video to generate a decompressed digital video. The systems disclosed herein further include extracting or otherwise identifying motion data while decompressing the compressed digital video. The systems disclosed herein also include analyzing the motion data to determine a subset of pixel data from the decompressed digital video (Continued)

to provide as input to an image processing model trained to generate an output based on input pixel data.

20 Claims, 11 Drawing Sheets

(51) Int. Cl.
*H04N 19/182* (2014.01)
*H04N 19/527* (2014.01)
*H04N 19/87* (2014.01)
*H04N 23/68* (2023.01)

(52) U.S. Cl.
CPC .......... *H04N 19/527* (2014.11); *H04N 19/87* (2014.11); *H04N 23/6811* (2023.01)

(56) References Cited

U.S. PATENT DOCUMENTS

2006/0136575 A1 6/2006 Payne et al.
2007/0147504 A1 6/2007 Wang et al.
2010/0118114 A1 5/2010 Hosseini et al.
2016/0148650 A1* 5/2016 Laksono .............. G11B 27/309 386/230
2018/0061459 A1 3/2018 Song et al.
2018/0157939 A1 6/2018 Butt et al.
2019/0035047 A1 1/2019 Lim et al.
2019/0042900 A1* 2/2019 Smith .................... G06V 10/96
2019/0220698 A1 7/2019 Pradeep
2019/0327486 A1* 10/2019 Liao ......................... G06N 3/08
2021/0176405 A1 6/2021 Ishii
2024/0320971 A1 9/2024 Thumpudi et al.

FOREIGN PATENT DOCUMENTS

JP 2006352879 A 12/2006
WO 2018230294 A1 12/2018

OTHER PUBLICATIONS

Vaswani, Ashish, et al. "Attention is all you need." Advances in neural information processing systems 30 (2017). (Year: 2017).*
"Non Final Office Action Issued in U.S. Appl. No. 16/298,841", Mailed Date: Dec. 30, 2022, 17 Pages.
Htike, et al., "A Monocular View-Invariant Fall Detection System for the Elderly in Assisted Home Environments", In Proceedings of Seventh International Conference on Intelligent Environments, Jul. 25, 2011, pp. 40-46.
Kim, et al., "Dynamic Security-Level Maximization for Stabilized Parallel Deep Learning Architectures in Surveillance Applications", In IEEE Symposium on Privacy-Aware Computing, Aug. 1, 2017, pp. 192-193.
"Notice of Allowance Issued in U.S. Appl. No. 16/298,841", Mailed Date: Sep. 28, 2023, 10 Pages.
Communication pursuant to Article 94(3) EPC Received for European Application No. 20714432.0, mailed on Jul. 22, 2024, 09 pages.
Office Action Received for Chinese Application No. 202080020602.7, mailed on Jun. 1, 2024, 25 pages. (English Translation Provided).
Office Action Received for India Application No. 202147037878, mailed on Apr. 25, 2024, 03 pages.
Sah, et al., "Semantic Text Summarization of Long Videos", IEEE Winter Conference on Applications of Computer Vision, Mar. 14, 2017, pp. 989-997.
Song, et al., "Multimedia Image and Video Processing: 14 Digital Media Archival," Retrieved from URL: https://www.routledge.com/Multimedia-Image-and-Video-Processing/Guan-He-Kung/p/book/9781138072534, Apr. 21, 2017, pp. 1-30.
"Notice of Allowance Issued in U.S. Appl. No. 16/298,841", Mailed Date: Jun. 22, 2023, 10 Pages.
"Office Action Issued in Indian Patent Application No. 202147037878", Mailed Date: Jul. 7, 2023, 8 Pages.
"Office Action Issued in European Patent Application No. 20715241.4", Mailed Date: Sep. 7, 2023, 7 Pages.
Escobedo-Cardenas, et al., "A Robust Gesture Recognition Using Hand Local Data and Skeleton Trajectory", In Proceedings of International Conference on Image Processing, Sep. 27, 2015, pp. 1240-1244.
Notice of Allowance dated Dec. 19, 2025, from U.S. Appl. No. 18/421,772, 11 pp.
Communication pursuant to Article 94(3) received in European Application No. 20715241.4, mailed on Jul. 15, 2025, 04 pages.
Intimation of Grant received for IN Application No. 202147037878, mailed on Jul. 7, 2024, 1 page.
Invitation To Pay Additional Fees received for PCT Application No. PCT/US20/020574, mailed on Jun. 26, 2020, 34 Pages.
Invitation to Pay Additional Fees received for PCT Application No. PCT/US20/020575 , mailed on May 12, 2020, 29 pages.
Non-Final Office Action mailed on Jun. 17, 2025, in U.S. Appl. No. 18/421,772, 36 pages.
Notice of Allowance Received for Chinese Application No. 202080020602.7, mailed on Jun. 9, 2025, 8 pages. (English Translation Provided).
Second Office Action Received for Chinese Application No. 202080020602.7, mailed on Jan. 13, 2025, 07 pages. (English Translation Provided).
U.S. Appl. No. 16/298,841, filed Mar. 11, 2019.
U.S. Appl. No. 18/421,772, filed Jan. 24, 2024.

* cited by examiner

SELECTIVELY IDENTIFYING DATA BASED ON MOTION DATA FROM A DIGITAL VIDEO TO PROVIDE AS INPUT TO AN IMAGE PROCESSING MODEL

CROSS-REFERENCE TO RELATED APPLICATIONS

This application is a Divisional of U.S. application Ser. No. 16/352,714, filed on Mar. 13, 2019, the entirety of which is incorporated herein by reference.

BACKGROUND

Recent years have seen a precipitous rise in the use of computing devices (e.g., mobile devices, personal computers, server devices) to capture, store, and edit digital media. Indeed, it is now common for electronic devices to capture digital media and process the digital media in various ways. For example, conventional media systems often include various applications or tools for compressing and decompressing digital videos. In addition, conventional media systems include a variety of applications and tools for processing digital images and digital videos. These media processing applications provide a wide range of utility in processing images and videos.

Nevertheless, while media processing applications provide useful tools for analyzing digital media and generating useful outputs, these applications and tools include a verity of problems and drawbacks. For example, many media processing applications are inefficient and/or consume significant processing resources to operate effectively. Indeed, with advances to wireless communication technology and the ability to share and transmit compressed digital content with more and more computing devices, conventional applications for processing digital media often require significant computing resources and processing time to execute applications successfully. To illustrate, media processing applications that utilize machine learning techniques can exhaust processing power of client computing devices as well as result in significant cloud computing expenses. Moreover, conventional media processing applications can take a significant amount of time to produce desired results.

These and other problems exist with regard to using various applications and software tools for analyzing and processing compressed digital media.

DETAILED DESCRIPTION

Figure 1:
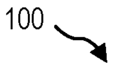
FIG. 1 illustrates an example environment including a motion-based pixel selection system in accordance with one or more implementations.
Figure 1:
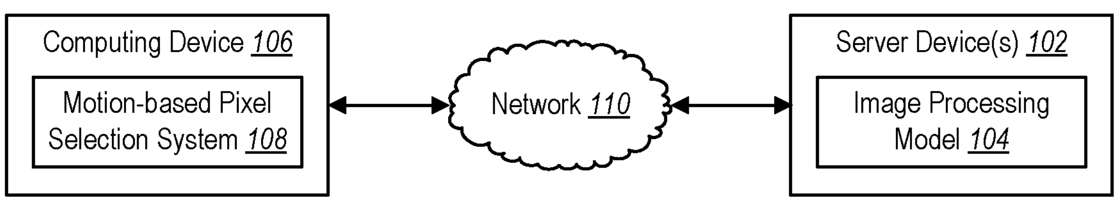

The present disclosure relates to a motion-based pixel selection system (or simply a "pixel selection system") implemented in connection with an image processing model. In particular, as will be discussed in further detail below, the pixel selection system may receive a compressed digital video. The pixel selection system can apply a decoder application to the compressed digital video to extract motion data (e.g., motion vector data, camera movement data) and generate a decompressed digital video. The pixel selection system can additionally identify a subset of pixel data for the decompressed digital video to provide to an image processing model, which may include a deep learning model.

To illustrate, upon receiving a compressed digital video, the pixel selection system can apply a decoder application configured to decompress the digital video. While decompressing the digital video, the pixel selection system can leverage motion data used in generating the decompressed digital video. For example, the pixel selection system can identify motion vector data including localized motion of content within the digital video (e.g., motion of a detected object between image frames of the video). In addition, the pixel selection system can identify camera movement data including global motion of content indicative of a video capturing device moving or panning while capturing the original video content. Additional detail in connection with identifying motion data will be discussed in further detail below.

The pixel selection system can utilize the motion data in a number of ways. For example, the pixel selection system can analyze the motion data to identify scenes of the decompressed digital video. In addition, the pixel selection system can analyze the motion data to identify scenes or sequences of image frames from the decompressed digital video that include movement of content displayed within the corresponding duration of the decompressed digital video. As another example, the pixel selection system can identify portions of select digital images from the decompressed digital video to identify regions of interest within the decompressed digital video.

As will be discussed in further detail below, the pixel selection system can utilize the motion data to identify portions of the decompressed digital video to provide as input to an image processing model. For example, the pixel selection system can selectively identify image frames at an associated frame rate based on motion data identified for discrete durations or segments of the decompressed digital video. As another example, the pixel selection system can selectively identify pixels or regions of pixels of image frames corresponding to content of interest from within the decompressed digital video. In addition, the pixel selection system can selectively identify pixel data based on any number of detected scenes from the decompressed digital video based on the motion data.

In addition to utilizing the motion data to identify portions of the decompressed digital video to provide to the image processing model, the pixel selection system can additionally provide motion data to the image processing model itself. For example, the pixel selection system can provide motion data including a combination of motion vector data and camera movement data extracted from the compressed digital video while decompressing the compressed digital video to provide as inputs an enhance the functionality of the image processing model. In one or more embodiments, the pixel selection system selectively provides motion data corresponding to the identified portions or subset of pixel data also provided as input to the image processing model.

Accordingly, where the image processing model refers to a neural network, machine learning model, or other deep learning model trained based on a combination of pixel data and associated motion data, the pixel selection system can further enhance the utility of the image processing model by providing extracted motion data as input to the image processing model. Indeed, the pixel selection system can provide both pixel data and corresponding motion data to further enhance functionality and/or efficiency of the image processing model.

The present disclosure includes a number of practical applications that provide benefits and/or solve problems associated with generating decompressed digital videos and analyzing pixel data from the decompressed digital videos. For example, by selectively identifying pixel data from the decompressed digital video based on motion data, the pixel selection system can leverage information obtained when decompressing a compressed digital video to intelligently identify pixel data to provide to an image processing model. In this way, the pixel selection system can provide fewer digital images and/or a limited quantity of pixel data to the image processing model thereby utilizing fewer resources of a computing device and/or cloud computing system on which the image processing model is implemented.

Furthermore, by providing motion data as an additional input to the image processing model, the pixel selection system can further enhance the accuracy and efficiency of an output generated by the image processing model. For example, by training an image processing model based on a combination of digital images and associated motion data, the image processing model can be trained using fewer images and pixel data than conventional processing models. In addition, by providing the motion data and associated pixel data from the decompressed digital video to a compatible image processing model, the pixel selection system can additionally facilitate more efficient and/or accurate analysis of pixel data to generate a useful output in less time and using fewer processing resources.

As illustrated in the foregoing discussion, the present disclosure utilizes a variety of terms to describe features and advantages of a pre-processing system. Additional detail will now be provided regarding the meaning of such terms. For example, as used herein, a "digital video" refers to digital data representative of a sequence of digital images (e.g., digital image frames). A digital video may include digital data or a digital file that is displayable via a graphical user interface of a display of a computing device. For instance, a digital video may include a sequence of digital images that comprise pixel data referring to discrete units or elements of a digital image that, when combined, form the displayable content of the digital image. A digital video may have a corresponding frame rate, resolution, or duration. By way of example, a digital video may refer to a digital file having one of the following extensions: AVI, FLV, WMV, MOV, MP4.

In one or more embodiments described herein, a digital video may refer to a compressed digital video. As used herein, a "compressed digital video" refers to a digital video whose pixel data has been reduced using one of a variety of compression techniques. For example, a compressed digital video may refer to a digital video that has been compressed using lossy or lossless compression algorithms. As a further example, in one or more embodiments, a compressed digital video is compressed using one or more block-oriented motion-compensation-based video compression standards. For instance, a compressed digital video may be compressed using formats including H.264, H.265, MPEG-4, VP9, VP10, or any other standard encoding or compression format.

In contrast to a compressed digital video, in one or more embodiments described herein, a digital video may refer to a decompressed digital video. As used herein, a "decompressed digital video" refers to a digital video that has been generated from a compressed digital video into an approximation of the original form of the digital video. For example, in one or more implementations described herein, a decompressed digital video is generated by applying a decoding or decompression algorithm to a compressed digital video file based on a format of the compressed digital video and/or compression algorithm applied to an original video to generate the compressed digital video. In one or more embodiments described herein, a compressed digital video is decompressed at least in part based on motion data extracted from the compressed digital video that provides reference data between one or more reference frames included within the compressed digital video.

As used herein, "motion data" refers to data included within a compressed digital video that provides information about movement of content between frames of the digital video. For example, motion data can refer to motion vectors, which may include two-dimensional vectors used for inter-prediction between image frames and which provides an offset from coordinates in a decoded image to coordinates in a reference image. Indeed, motion vectors may refer to data elements utilized as part of a motion estimation process in decompressing a compressed digital video to generate a decompressed digital video. In one or more embodiments described herein, motion data refers specifically to motion vectors that provide information about localized movement of displayed content (e.g., motion of an object) moving within a digital video relative to other content that appears within the digital video. Alternatively, in one or more implementations, motion data refers to camera movement associated with movement of a video capturing device causing uniform movement of all content (e.g., global movement) from frame to frame of the digital video.

As discussed above, pixel data may be provided to an image processing model for generating an output. As used herein, an "image processing model" refers to any model trained to generate an output based on input pixel data. The image processing model may refer to one or more of a computer algorithm, a classification model, a regression model, an image transformation model, or any type of model having a corresponding application or defined functionality. The image processing model may additionally refer to a deep learning model, such as a neural network (e.g., convolutional neural network, recurrent neural network) or other machine learning architecture trained to perform a variety of applications based on input pixel data. In one or more implementations, the image processing model is trained to generate an output based on both input pixel data and associated motion data.

As used herein, an "output" of the image processing model may refer to any type of output based on a type of image processing model or application or functionality incorporated by the image processing model. For example, where the image processing model refers to a classification model, an output of the image processing model may include a classification of one or more images such as whether a face is detected, an identification of an individual associated with the face, an identification of an object within the image(s), a rating for the image or video, a count of detected faces or other objects, or any other classification of one or more image frames. As another example, where the image processing model includes an application for augmenting a digital video, the image processing model may generate an output including a digital video including additional metadata (e.g., scene data), a reduced version of the digital video (e.g., a shortened video including cut scenes), a thumbnail image representative of the digital video, or other image or video output in accordance with a specific functionality or training of the image processing model.

Additional detail will now be provided regarding a motion-based pixel selection system in relation to illustrative figures portraying example implementations. For example, FIG. 1 illustrates an example environment 100 that includes a schematic diagram of a server device 102 having an image processing model 104 implemented thereon. The environment 100 further includes a schematic diagram of a computing device 106 having the motion-based pixel selection system 108 (or simply "pixel selection system 108") implemented thereon.

As shown in FIG. 1, the server device(s) 102 and computing device 106 can communicate with each other directly or indirectly through a network 110. The network 110 may include one or multiple networks and may use one or more communication platforms or technologies suitable for transmitting data. The network 110 may refer to any data link that enables the transport of electronic data between devices and/or modules of the environment 100. The network 110 may refer to a hardwired network, a wireless network, or a combination of hardwired and wireless networks. In one or more embodiments, the network 110 includes the Internet.

The computing device 106 may refer to various types of computing devices. For example, the computing device 106 may include a mobile device such as a mobile telephone, a smartphone, a PDA, a tablet, or a laptop. Additionally, or alternatively, the computing device 106 may include a non-mobile device such as a desktop computer, server device, or other non-portable device. The server device(s) 102 may similarly refer to various types of computing device. Each of the computing device 106 and the server device(s) 102 may include features and functionality described below in connection with FIG. 8.

As mentioned above, and as will be discussed further below, the computing device 106 may receive, access, or otherwise obtain a compressed digital video. The computing device 106 may receive the compressed digital video from a variety of sources. For example, the computing device 106 may receive the compressed digital video as part of a broadcast of compressed data via an internet stream or other online transmission. As another example, the computing device 106 may retrieve, access, or otherwise receive the compressed digital video from a storage space on the computing device 106 or other source.

Upon receiving the compressed digital video, a decoder application on the pixel selection system 108 may be used to decompress the compressed digital video and extract motion data while decompressing the compressed digital video. For example, using the decoder application, the pixel selection system 108 can generate a decompressed digital video representative of an original version of the digital video from which the compressed digital video was generated. In particular, the pixel selection system 108 can apply a decompression algorithm to a compressed digital video to reconstruct pixel data from the information included within the compressed digital video to generate a digital video including pixel data that approximates the original digital video.

In addition to generating the decompressed digital video, the pixel selection system 108 can extract or otherwise identify motion data while decompressing the compressed digital video. For example, where decompressing the compressed digital video involves utilizing a combination of reference images and motion vectors, the pixel selection system 108 can identify motion vectors and other motion data (e.g., camera movement data) used in the process of decompressing the compressed digital video to generate the decompressed digital video. Thus, the pixel selection system 108 can leverage motion data already included within the compressed digital video and which is identified and used by the pixel selection system 108 when decompressing the compressed digital video.

Upon identifying the motion data from the compressed digital video, the pixel selection system 108 can additionally utilize the motion data to selectively identify pixel data from the decompressed digital video to provide to the image processing model 104. In particular, the pixel selection system 108 can determine pixel data associated with local or global motion within a display of video content from the decompressed digital video and provide that pixel data as input to the image processing model 104. As another example, the pixel selection system 108 can identify one or more scenes from the decompressed digital video based on the motion data and selectively provide digital images for one or more of the scenes to the image processing model 104.

In one or more embodiments, the pixel selection system 108 selectively provides the pixel data based on one or more applications of the image processing model 104. In addition, in one or more embodiments, the pixel selection system 108 can provide motion data extracted while decompressing the compressed digital image as input to the image processing model 104 (e.g., in addition to identified pixel data). Additional detail in connection with selectively identifying pixel data and/or motion data to provide to the image processing model 104 is discussed below.

Upon receiving input data (e.g., pixel data, motion data), the image processing model 104 can apply one or more applications and/or algorithms of the image processing model 104 to the input data to generate an output. For example, the image processing model 104 can generate one or more classifications, output images, decoded data, metadata, transformed videos, thumbnail images, or any other output based on training of the image processing model 104 to generate a desired output.

While FIG. 1 illustrates an example environment 100 including a particular number and arrangement of server device(s) 102 and computing device 106, it will be understood that the environment 100 may include any number of devices. For example, the environment may include the image processing model 104 and the pixel selection system 108 implemented on the device or network of devices and/or across multiple devices, as shown in FIG. 1. For example, in one or more embodiments, the image processing model 104 is implemented on a cloud computing system including the server device(s) 102. Alternatively, the image processing model 104 may be implemented on an edge device and/or the same device as the pixel selection system 108 with communication between modules and internal components of a single computing device.

Figure 2A:
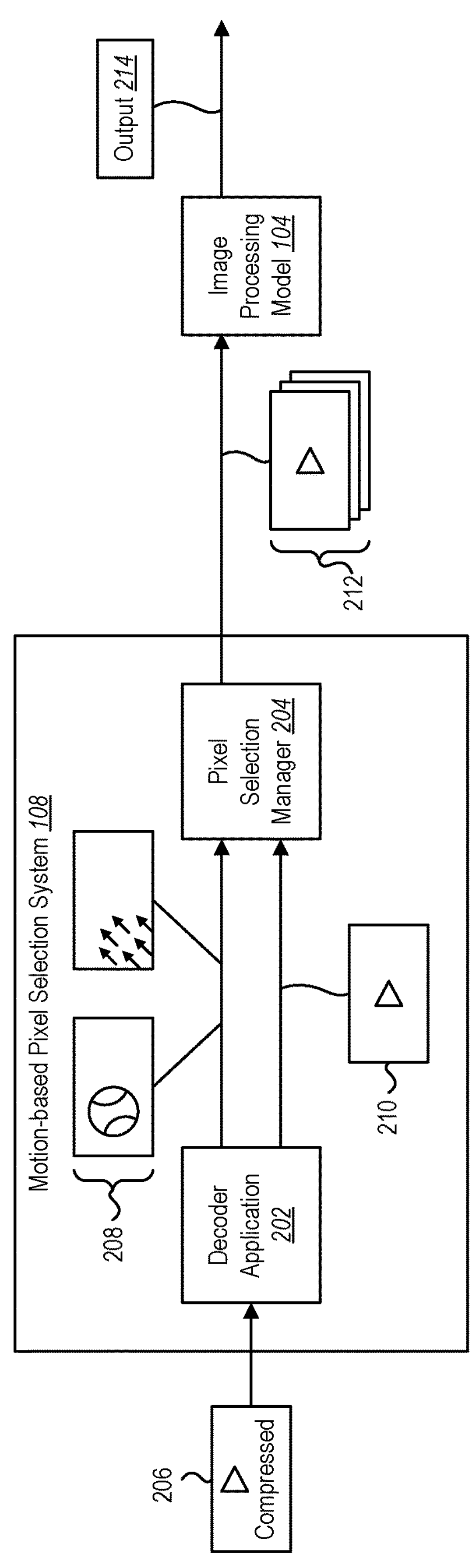
FIG. 2A illustrates an example process for using motion data to identify and provide pixel data from a decompressed digital video to an image processing model in accordance with one or more implementations.

Moving on to FIG. 2A, this figure illustrates an example framework for selectively identifying pixel data to provide as input to an image processing model 104 in accordance with one or more embodiments described herein. As shown in FIG. 2A, the pixel selection system 108 may include a decoder application 202 and a pixel selection manager 204. The decoder application 202 may receive a compressed digital video 206. The compressed digital video 206 may include a compressed video file for any type of digital video. For instance, the compressed digital video 206 may include compressed video content for an animated video, a received video broadcast (e.g., a live video stream), or a locally stored video file including compressed video previously received or generated (e.g., captured) by the computing device 106.

The decoder application 202 may apply a decompression or decoding algorithm to the compressed digital video 206 to generate a decompressed digital video 210 including pixel data representative of an original version of the digital video prior to being compressed. As discussed above, the decoder application 202 can identify and apply a decompression algorithm based on a format of the compressed digital video or a known compression algorithm used to generate the compressed digital video 206. In one or more embodiments, the decoder application 202 generates the decompressed digital video 210 based at least in part on motion data approximation, which may involve estimating or approximating pixel values based on reference images, motion vectors, camera movement, and other information included within the compressed digital video 206.

As shown in FIG. 2A, the decoder application 202 can provide the decompressed digital video 210 to the pixel selection manager 204. In addition to the decompressed digital video 210, the decoder application 202 may identify motion data 208 and provide the motion data 208 to the pixel selection manager 204. In one or more implementations, the decoder application 202 identifies the motion data 208 relied upon while generating the decompressed digital video 210. For example, as shown in FIG. 2A, the motion data 208 may include one or more reference frames, which may refer to one or more of an intra-coded frame (I-frame), a predicted frame (P-frame), or a bidirectional frame (B-frame) and associated vector data. In addition, the motion data 208 may include motion vector data, which may include information about localized motion of content (e.g., motion of an object) relative to a reference frame. In addition to motion vector data, the motion data 208 may include camera movement data, which may include information about global motion of content (e.g., motion of a video capturing device capturing an original video) relative to a reference frame.

Upon receiving the motion data 208 and decompressed digital video 210, the pixel selection manager 204 can analyze the motion data 208 associated with the decompressed digital video 210 to identify a subset of pixel data 212 from the decompressed digital video 210 and provide the subset of pixel data 212 to the image processing model 104. For example, the pixel selection manager 204 may identify a subset of image frames from a plurality of image frames that make up the decompressed digital video 210 based on the motion data 208. As another example, the pixel selection manager 204 may selectively identify portions or regions of images from within respective image frames of the decompressed digital video 210 based on the motion data 208.

The pixel selection manager 204 may apply a variety of criteria to the motion data 208 to determine the subset of pixel data 212 to provide to the image processing model 104. For example, the pixel selection manager 204 may identify portions of the decompressed digital video including movement of content based on motion vectors or panning of content based on camera movement and selectively provide pixel data in accordance with the detected motion. In one or more embodiments, the pixel selection manager 204 provides pixel data to the image processing model 104 in response to detecting motion data 208 (e.g., where the compressed digital video 206 is received via a live broadcast or streaming video). The pixel selection manager 204 can additionally provide varying quantities of pixel data to the image processing model 104 based on the motion data 208 corresponding to different portions of the decompressed digital video 210.

In one or more embodiments, the pixel selection manager 204 selectively identifies a subset of image frames from the decompressed digital video 210 based on motion data 208 associated with the respective image frames. For example, the pixel selection manager 204 may selectively identify any image frames associated with motion vectors or camera movement to provide as inputs to the image processing model 104. Alternatively, where motion data 208 indicates motion vectors or camera movement over a duration (e.g., a scene or segment of multiple image frames) of the decompressed digital video 210, the pixel selection manager 204 selectively identifies digital images at a higher frame rate for the duration of the decompressed digital video 210 than for other sequences of the decompressed digital video 210 for which no motion data 208 exists.

In one or more implementations, the pixel selection manager 204 may selectively consider motion vectors and other motion data based on detected noisiness of the motion vectors and other motion data. The pixel selection manager 204 can additionally perform post-processing on the motion data (e.g., motion vectors) to generate higher level abstractions such as global and local motion maps, regions of homogeneous movement, or other motion-related data for one or more images from the decompressed digital video 210. In one or more embodiments, global motion data can indicate whether a camera was panning, zooming, and/or rolling through multiple parameters as opposed to a dense motion vector map. The motion vectors may then provide local motion relative to the global motion, which the pixel selection manager 204 may consider in identifying subsets of pixels to provide as input to the image processing model 104.

For example, in one or more embodiments, the pixel selection manager 204 may consider the camera movement data to refine motion vector data identified within the video content. The pixel selection manager 204 may then consider the refined motion vector data in selectively identifying the subset of pixel data to provide as input to the image processing model 104. Accordingly, in one or more embodiments, the pixel selection manager 204 may consider a combination of both camera movement data and motion vector data in determining pixel data to provide to the image processing model 104. In one or more embodiments, the pixel selection manager 204 can provide the refined motion data (e.g., the refined motion vector data) as a further input to the image processing model 104 in accordance with one or more embodiments described below.

In one or more embodiments, the pixel selection manager 204 identifies one or more scenes of the decompressed digital video 210 based on the motion data 208. For example, the motion data 208 may indicate a discontinuity between subsequent frames as a result of a change in displayed content, a switch between video feeds from two different video capturing devices, or other cause of discontinuity in the displayable content of the decompressed digital video 210. In one or more embodiments, the pixel selection manager 204 identifies and provides the subset of pixel data 212 to the image processing model 104 based on motion data associated with the identified scene(s). For instance, the pixel selection manager 204 may identify the subset of pixel data 212 in response to detecting a scene. In one or more embodiments, the pixel selection manager 204 identifies different subsets of pixel data based on motion data 208 for the identified scene(s). Additional data in connection with an example of providing the subset of pixel data 212 based on one or more detected scenes is discussed in further detail in connection with FIG. 3 below.

In yet another example, the pixel selection manager 204 can identify the subset of pixel data 212 corresponding to portions of digital images based on motion data 208 corresponding to different portions of the digital images that make up the decompressed digital video 210. For example, where only a small region of the decompressed digital video 210 includes motion data 208, the pixel selection manager 204 can selectively provide pixel data corresponding to the small region of the decompressed digital video 210 to the image processing model 104 (e.g., without providing pixel data for other portions of the decompressed digital video 210).

In any of the above examples, the pixel selection manager 204 may selectively identify the subset of pixel data 212 to provide to the image processing model 104 based on one or more features or characteristics of the image processing model 104. For example, the pixel selection manager 204 may identify a subset of digital images from a plurality of digital images based on a capability of a server device, computing device, or other device on which the image processing model 104 is implemented to process input images using the image processing model 104. As another example, the pixel selection manager 204 may identify a number of digital images or a quantity of pixel data based on a limit or allowance of cloud computing resources for a device or user account (e.g., where the image processing model 104 is implemented on a cloud computing system).

As a further example, the pixel selection manager 204 can selectively identify a subset of pixel data 212 based on an application of the image processing model 104 (e.g., based on a type of output 214 that the image processing model is trained to generate) and/or a type of the image processing model 104 (e.g., a neural network, a classification model, an image transformation model). For example, where the image processing model 104 is trained to generate an augmented reality background, the pixel selection manager 204 may select only portions of digital images from the decompressed digital video 210 corresponding to foreground content (e.g., based on motion data 208). As another example, where the image processing model 104 is trained to generate a thumbnail or identify a representative image for the decompressed digital video 210, the pixel selection manager 204 may selectively provide entire image frames to the image processing model 104 (e.g., rather than select portions of images or regions of pixels within respective digital images).

As another example, the pixel selection manager 204 may identify a subset of digital images or portions of digital images to provide as input based on a type of image processing model 104 (e.g., a neural network, a classification model, an image transformation model) or a type of output 214 that the image processing model 104 is trained to generate. For instance, the pixel selection manager 204 can identify a number of images or rate of images within the decompressed digital video 210 based on a complexity and application of the image processing model 104. For example, the pixel selection manager 204 can provide a greater number or higher rate of digital images for analysis to a less complex image processing model (e.g., a simple algorithm) than where the image processing model 104 is more complex (e.g., a complex neural network or deep learning model).

As shown in FIG. 2A, upon receiving the subset of pixel data 212, the image processing model 104 can generate an output 214 including a variety of values and/or images. For example, as discussed above, depending on training or an application of the image processing model 104, the output 214 may include a classification of the video or image, a value associated with the video or image, information about the video or image (or a scene), a transformed image, or any other output associated with the decompressed digital video 210 generated by the decoder application 202. The output 214 may be provided to the computing device 106 for storage, display, or for further processing.

Figure 2B:
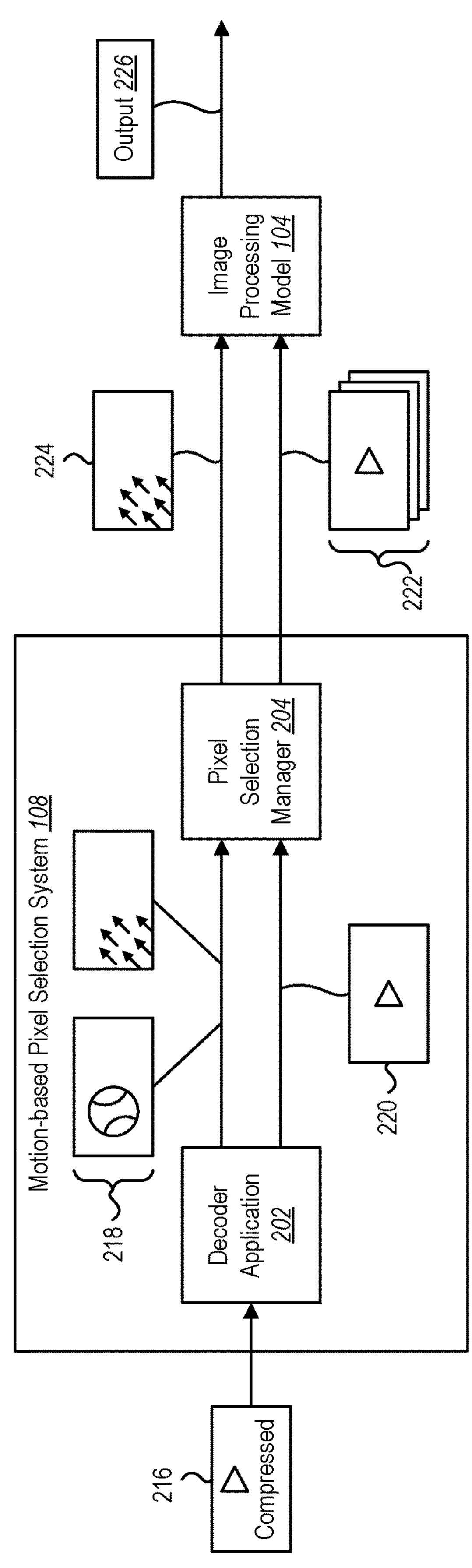
FIG. 2B illustrates an example process for using motion data to identify pixel data from a decompressed digital video and providing the motion data and pixel data to an image processing model in accordance with one or more implementations.

FIG. 2B illustrates another example framework in accordance with one or more embodiments described herein that includes identifying and providing pixel data and associated motion data as inputs to an image processing model 104. In particular, similar to FIG. 2A, the decoder application 202 may receive a compressed digital video 216. The decoder application 202 may similarly decompress the compressed digital video 216 to generate a decompressed digital video 220 representative of an original digital video prior to performing a compression processes. In addition, the decoder application 202 can extract or otherwise identify motion data 218 extracted from the compressed digital video 216 and used as part of the decompression process to generate the decompressed digital video 220.

As shown in FIG. 2B, the pixel selection manager 204 can identify pixel data 222 and corresponding motion data 224 to provide as inputs to the image processing model 104. In one or more embodiments, the identified pixel data 222 includes a subset of pixel data similar to the subset of pixel data 212 discussed above in connection with FIG. 2B. Alternatively, in one or more embodiments, the pixel selection manager 204 provides pixel data 222 including any or all pixel data from the decompressed digital video 220. In one or more embodiments, the pixel selection manager 204 provides pixel data 222 including one or more transformed or modified digital images as inputs to the image processing model 104.

In addition to providing the input pixel data 222, the pixel selection manager 204 can identify and provide input motion data 224 to the image processing model 104. For example, the pixel selection manager 204 can identify a subset of the motion data 218 identified by the decoder application 202 including motion data 224 associated with the identified pixel data 222. As another example, the pixel selection manager 204 can identify motion vector data to provide as input without providing camera movement data. Alternatively, in one or more embodiments, the pixel selection manager 204 provides motion data 224 to the image processing model 104 including any motion data 218 identified by the decoder application 202.

As further shown, the image processing model 104 can generate an output 226 including one of a variety of different types of outputs discussed herein. For example, the image processing model 104 can generate an output 226 in a similar way as discussed above in connection with generating the output 214 shown in FIG. 2A.

While FIGS. 2A and 2B illustrate different inputs that are selected and provided to the image processing model 104, it will be understood that features and functionality discussed in connection with FIG. 2A may be applied in combination with features and functionality discussed in connection with FIG. 2B (and vice versa). As an illustrative example, with respect to FIG. 2A, the pixel selection manager 204 may identify and provide motion data as an additional input to the image processing model in addition to the identified subset of pixel data 212.

Figure 3:
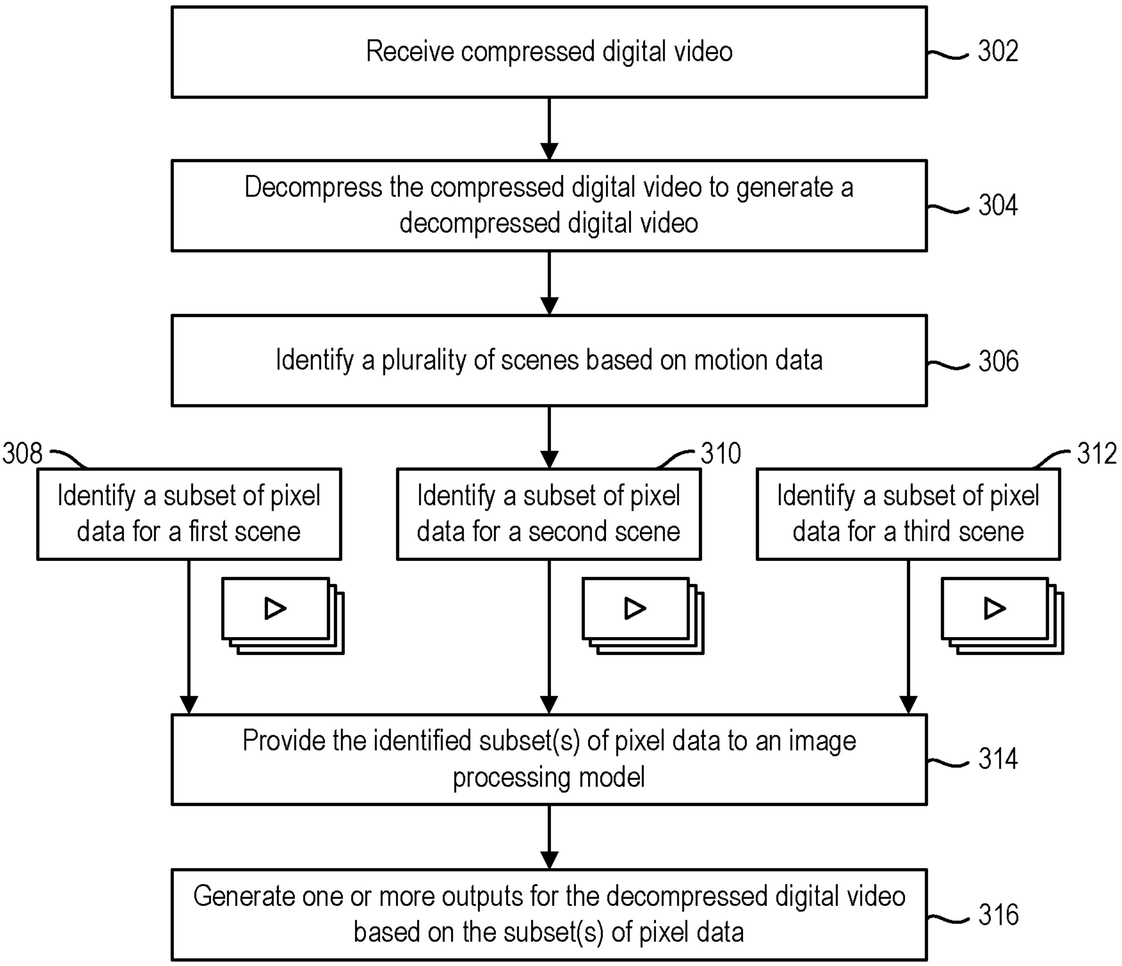
FIG. 3 illustrates an example process for identifying scenes from a digital video based on motion data and selectively providing pixel data from the identified scenes to an image processing model in accordance with one or more implementations.

FIG. 3 illustrates another example implementation of the pixel selection system 108 for identifying pixel data based on associated motion data and providing the identified pixel data to the image processing model 104. In particular, FIG. 3 illustrates an example implementation in which the pixel selection system 108 identifies scenes of a decompressed digital video and selectively provides pixel data for the identified scenes as input to an image processing model 104.

As shown in FIG. 3, the pixel selection system 108 can perform an act 302 of receiving a compressed digital video. In addition, the pixel selection system 108 can perform an act 304 of decompressing the compressed digital video to generate a decompressed digital video. The acts 302-304 of receiving the compressed digital video and decompressing the compressed digital video may include similar features as similar acts discussed above. Similar to one or more implementations discussed above, the pixel selection system 108 can extract or otherwise identify motion data descriptive of local or global movement of content within the decompressed digital video while performing the process of decompressing the compressed digital video.

As further shown in FIG. 3, the pixel selection system 108 can perform an act 306 of identifying a plurality of scenes based on the motion data. For example, the pixel selection system 108 can analyze the motion data to detect discontinuities of movement between image frames and determine, based on the detected discontinuities of movement, a change between two scenes of the decompressed digital video.

Two different scenes may be identified or detected in a number of ways. For example, the pixel selection system 108 may analyze the motion data to determine that two consecutive image frames (or segments of image frames) were captured by different video capturing devices. As another example, the pixel selection system 108 can analyze the motion data to characterize a first set of consecutive digital images as part of a first duration of the decompressed digital video in which no movement is taking place and characterize a second set of consecutive digital images as part of a second duration of the decompressed digital video in which detected movement is taking place. As a further example, the pixel selection system 108 can identify the beginning and end of detected scenes within the decompressed digital video. The pixel selection system 108 can identify multiple consecutive scenes including durations of digital content that appear sequentially within the decompressed digital video. In addition, the pixel selection system 108 can identify non-adjacent scenes referring to selectively identified durations of the decompressed digital video.

As further shown in FIG. 3, the pixel selection system 108 can selectively identify subsets of pixels from the identified scenes of the decompressed digital video. For example, the pixel selection system 108 can perform an act 308 of identifying a subset of pixel data for a first scene. As further shown, the pixel selection system 108 can perform an act 310 of identifying a subset of pixel data for a second scene. The pixel selection system 108 can additionally perform an act 312 of identifying a subset of pixel data for a third scene.

The pixel selection system 108 can identify the respective subsets of pixels for the detected scenes based on motion data corresponding to the respective scenes. For example, the pixel selection system 108 can identify the first subset of pixel data for the first scene based on motion data unique to the first scene. The pixel selection system 108 can additionally identify the second and third subsets of pixel data based on motion data corresponding to the respective second and third scenes.

As an illustrative example, the pixel selection system 108 can identify digital images from the identified scenes at a frame rate corresponding to the motion data for the respective scenes. For example, where the first scene includes little or no movement of content (e.g., minimal motion vector or camera movement data), the pixel selection system 108 can identify digital images at a low frame rate. In contrast, where the second scene includes a higher rate of movement based on a significant presence of motion vectors or camera movement data, the pixel selection system 108 can identify digital images for the second scene at a higher frame rate than the first scene. The pixel selection system 108 can identify digital images for the third scene at a similar or different frame rate as the first and second scenes. Indeed, the pixel selection system 108 can identify digital frames from the respective scenes as a function of movement data where a higher metric of movement causes the pixel selection system 108 to identify digital images at a higher frame rate for scenes having significant movement while identifying digital images at a lower frame rate for scenes having less movement.

Similar to one or more implementations described above, the pixel selection system 108 can additionally perform an act 314 of providing the identified subsets of pixel data to the image processing model 104. For example, the pixel selection system 108 can provide each of the subsets of pixel data identified for the corresponding scenes to the image processing model 104 for processing. In one or more embodiments, the pixel selection system 108 provides the subset of pixel data as a stream of pixel data as the compressed digital video is received and decompressed.

The image processing model 104 may additionally perform an act 316 of generating one or more outputs for the decompressed digital video based on the subset(s) of pixel data. As discussed above, the image processing model 104 can generate a variety of different outputs based on a type of image processing model 104 and/or on an application of the image processing model 104. For example, the image processing model 104 can generate outputs including output images, classifications, or other output associated with the input subset of pixel data provided as input to the image processing model.

Figure 4A:
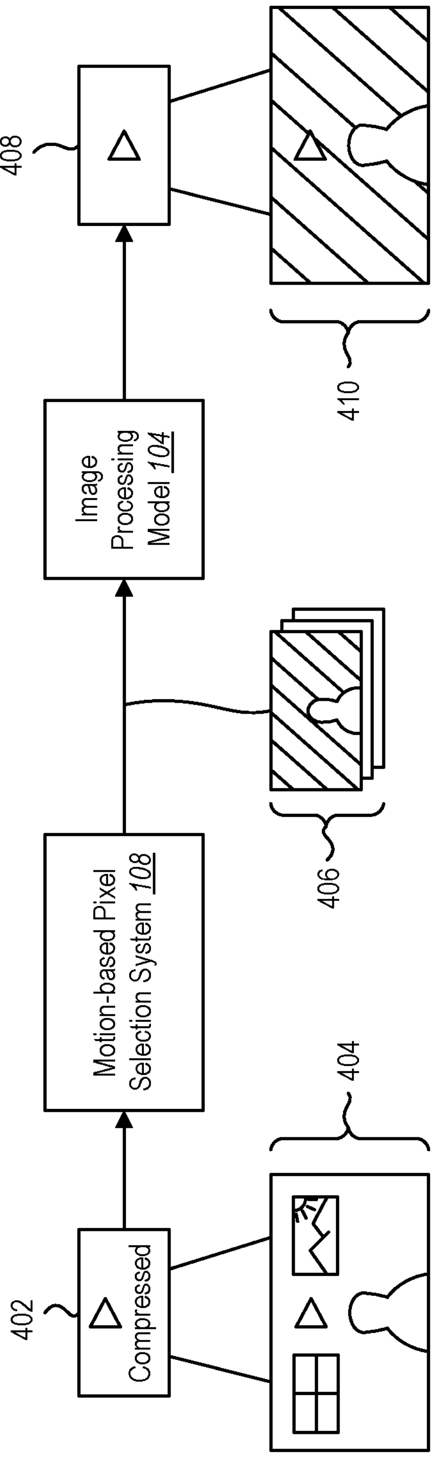
FIGS. 4A-4C illustrate example implementations of the motion-based image selection system in accordance with one or more implementations.
Figure 4B:
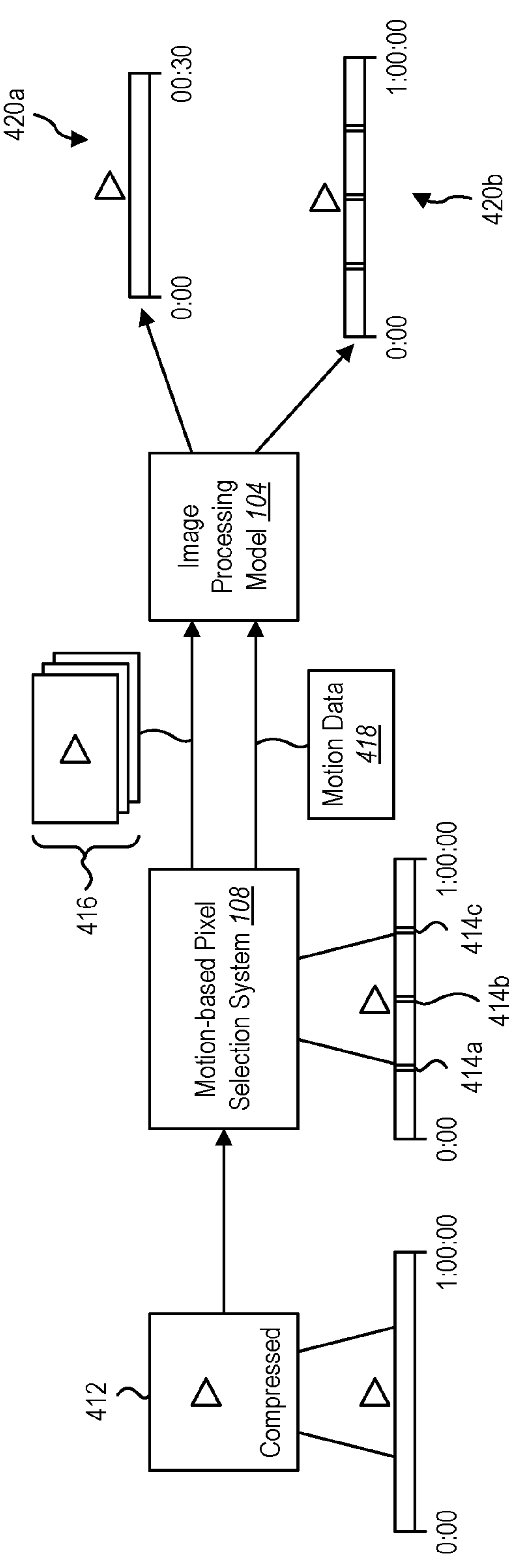
Figure 4C:
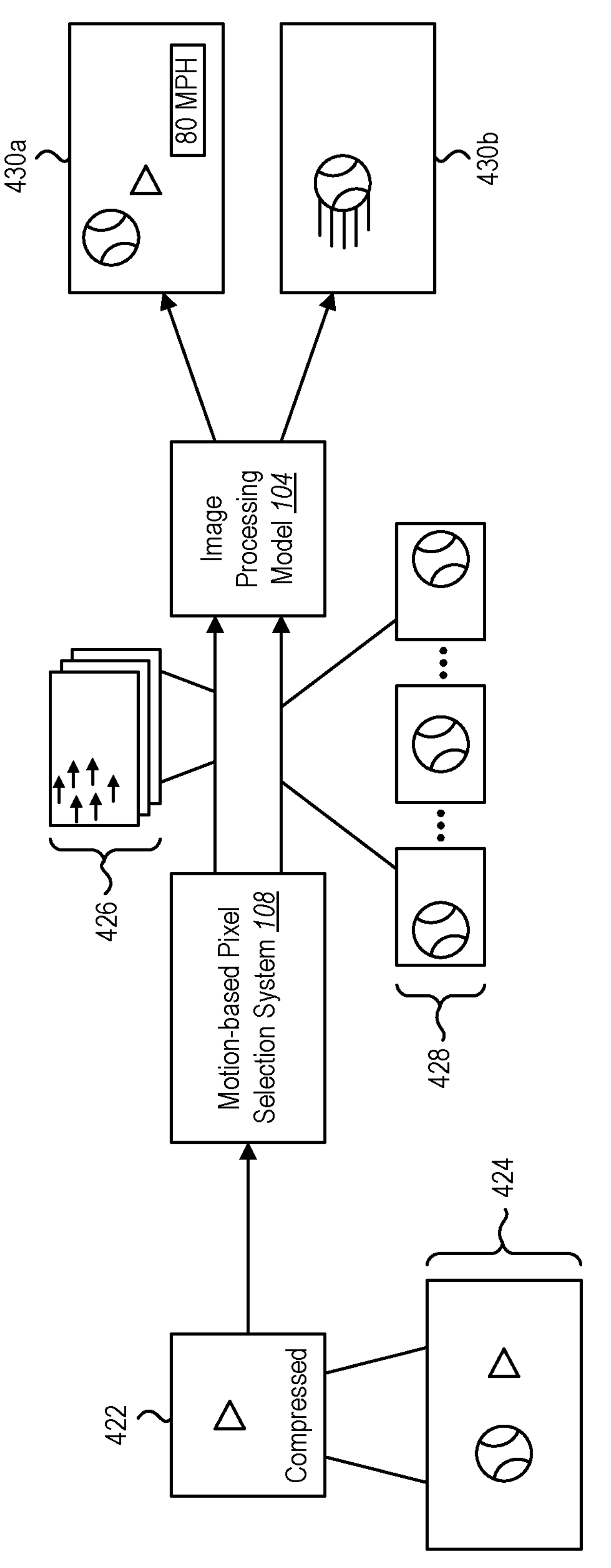

Moving on to FIGS. 4A-4C, the pixel selection system 108 may be implemented in a variety of practical applications and various-use cases. For example, FIG. 4A illustrates an example implementation in which the pixel selection system 108 receives a compressed digital video 402 including compressed pixel data for displayable video content 404. The pixel selection system 108 may receive the compressed digital video 402 and generate a decompressed digital video in accordance with one or more examples discussed above. In addition, the pixel selection system 108 can extract or otherwise identify motion data obtained while decompressing the compressed digital video 402.

The pixel selection system 108 can additionally analyze motion data associated with the displayable video content 404 to identify select portions of the decompressed digital video to provide as input to the image processing model 104. As an example, the pixel selection system 108 can analyze motion data to identify foreground and background portions of the displayable video content 404. The pixel selection system 108 can then isolate pixels corresponding to the foreground portion of the displayable video content 404 to identify a subset of pixel data 406 from the decompressed digital video to provide as input to the image processing model 104. As shown in the example illustrated in FIG. 4A, the pixel selection system 108 can selectively provide pixel data including select portions of digital image frames to the image processing model 104.

In accordance with one or more embodiments described herein, the image processing model 104 can generate an output 408 based on the subset of pixel data 406 provided as input to the image processing model 104. The output 408 may include a variety of different types of outputs based on an application or training of the image processing model 104. As an example, the output 408 may include an output digital video 410 including a display of the foreground content of the displayable video content 404 in addition to a modified background (e.g., augmented reality background).

FIG. 4B illustrates another example implementation in accordance with one or more embodiments described herein. As shown in FIG. 4B, the pixel selection system 108 can receive a compressed digital video 412, decompress the compressed digital video, and identify motion data descriptive of movement within the digital video while generating the decompressed digital video. As shown in FIG. 4B, the compressed digital video 412 may have a duration (e.g., one hour) of displayable video content.

Upon generating the decompressed digital video, the pixel selection system 108 can analyze motion data identified from the compressed digital video 412 to identify portions of interest 414*a-c* associated with motion of displayable content within the decompressed digital video. In the example illustrated in FIG. 4B, the pixel selection system 108 can identify three segments of interest 414*a-c* of the decompressed digital video based on motion data corresponding to identified portions of the decompressed digital video.

Upon identifying the segments of interest 414*a-c* of the decompressed digital video, the pixel selection system 108 can provide identified pixel data 416 corresponding to the segments of interest 414*a-c* as input to the image processing model 104. For example, the pixel selection system 108 can identify and provide any digital image frames for the identified segments of interest 414*a-c* to the image processing model 104. As another example, the pixel selection system 108 can select a subset of digital image frames from the identified segments of interest 414*a-c*. As a further example, the pixel selection system 108 can selectively provide digital image frames from different locations within the decompressed digital video, however, the pixel selection system 108 may identify and provide a higher number or frame rate of digital images from the identified segments of the decompressed digital video.

In addition to selectively identifying pixel data to provide as an input to the image processing model 104, the pixel selection system 108 can additionally provide motion data 418 corresponding to the subset of pixel data 416 provided to the image processing model 104. For example, the pixel selection system 108 can selectively identify and provide motion data 418 corresponding to the subset of pixel data 416. Alternatively, the pixel selection system 108 can provide any additional motion data 418 identified when decompressing the compressed digital video 412.

Similar to one or more embodiments described above, the image processing model 104 can generate a variety of outputs based on the pixel data 416 and associated motion data 418. For example, based on an application and/or training of the image processing model 104, the image processing model 104 can generate a first output 420*a* including a reduced clip of the decompressed digital video that includes the segments of interest 414*a-c* associated with the motion data 418. As another example, the image processing model 104 can generate a second output 420*b* including a transformed digital video having metadata or other information tagged to the decompressed digital video. For instance, the image processing model 104 may generate a digital video including tracks or tagged locations within the decompressed digital video to enable a viewer of the digital video to skip to key parts or parts of the digital video that include content of interest (e.g., moving objects).

FIG. 4C illustrates yet another example implementation in accordance with one or more embodiments described herein. As shown in FIG. 4C, the pixel selection system 108 receives a compressed digital video 422 including displayable video content 424. The pixel selection system 108 can additionally decompress the compressed digital video 422 to generate a decompressed digital video in accordance with various examples discussed above. The pixel selection system 108 can additionally provide a plurality of inputs to the image processing model 104.

For example, as shown in FIG. 4C, the pixel selection system 108 can provide motion data 426 corresponding to a plurality of digital image frames 428 to the image processing model 104. In addition, the pixel selection system 108 can provide pixel data including a plurality of digital image frames 428 to the image processing model 104. In one or more embodiments, the pixel selection system 108 selects the digital image frames 428 from a larger collection of image frames that make up the decompressed digital video based on the corresponding motion data 426. In one or more embodiments, the pixel selection system 108 selects the digital image frames 428 at a corresponding frame rate based on an application of the image processing model 104 and/or capabilities of a device (e.g., a server device) on which the image processing model 104 is implemented.

Because the image processing model 104 receives both the digital image frames 428 and the associated motion data 426, the image processing model 104 can analyze the received inputs to generate a variety of different outputs. For example, as shown in FIG. 4C, the image processing model 104 can generate a first output 430*a* including a transformed digital video that includes both the displayable video content 424 from the original digital video in addition to speed or other motion data of content displayed within the digital video (e.g., based on the motion data 426). For example, where the image processing model 104 is trained to determine a speed of an object based on detected content within the digital image frames 428 and corresponding motion data 426, the image processing model 104 may provide an indication of a speed of an object (e.g., a baseball) moving between digital image frames of the decompressed digital video.

As another example, the image processing model 104 can generate a second output 430*b* including a representative image (e.g., a thumbnail) for the compressed digital video 422 based on training of the image processing model 104. For instance, where the image processing model 104 is trained to generate the highest quality image, the image processing model 104 may analyze the digital image frames 428 received as inputs to the image processing model 104 to selectively identify which image frame is the highest quality according to training data previously used to train the image processing model 104. As another example, where the image processing model 104 is trained based on a collection of user ratings for associated training thumbnail images, the image processing model 104 may selectively identify digital image frames 428 to use in generating a representative image that the image processing model 104 predicts would be the best approximation of what a user would manually select from the plurality of digital image frames 428 provided as input to the image processing model 104.

It will be understood that each of FIGS. 4A-4C are provided by way of example. Thus, while FIGS. 4A-4C provide examples of specific embodiments where different types of pixel data (e.g., cropped images, select image frames) are provided as well as examples in which motion data is provided or withheld as input to the image processing model 104, it will be understood that features in connection with any of the examples above can be applied to one or more additional examples in different embodiments. Moreover, it will be understood that specific examples of outputs may similarly apply to different embodiments described herein.

Figure 5:
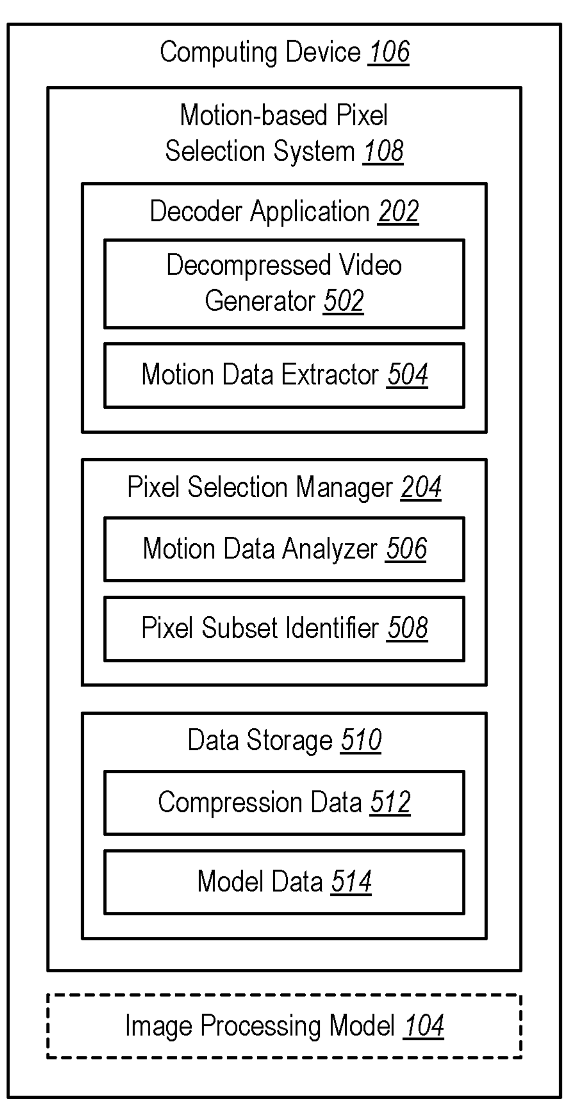
FIG. 5 illustrates an example schematic diagram of a computing device including a motion-based pixel selection system implemented thereon.

Turning now to FIG. 5, additional detail will be provided regarding components and capabilities of an example architecture for the pixel selection system 108. As shown in FIG. 5 and as discussed above in connection with FIG. 1, the pixel selection system 108 can be implemented by a computing device 106, which may refer to a variety of devices such as a mobile device (e.g., a smartphone or laptop), a non-mobile consumer electronic device (e.g., a desktop computer), an edge computing device, server device, or other computing devices. In accordance with one or more implementations described above, the pixel selection system 108 can selectively identify and provide pixel data from a decompressed digital video to an image processing model 104 based on motion data associated with different portions of the decompressed digital video. In addition, in one or more embodiments, the pixel selection system 108 identifies and provides motion data to the image processing model 104 for use in generating an output based on training of the image processing model 104.

As shown in FIG. 5, pixel selection system 108 includes a decoder application 202 and a pixel selection manager 204. The decoder application 202 includes a decompressed video generator 502 and a motion data extractor 504. The pixel selection manager 204 includes a motion data analyzer 506 and a pixel subset identifier 508. As further shown, the pixel selection system 108 includes a data storage 510 having compression data 512 and model data 514 stored thereon.

As further shown in FIG. 5, the computing device 106 may optionally include the image processing model 104 thereon. In particular, as an alternative to the image processing model 104 implemented on one or more server device(s) 102 (e.g., a cloud computing system) as discussed above in connection with FIG. 1, the image processing system may be implemented on the same computing device 106 as the pixel selection system 108 to cooperatively generate an output based on pixel data selectively identified and provided as input to the image processing model 104.

As shown in FIG. 5, the pixel selection system 108 includes a decoder application 202, which may include a decompressed video generator 502 for decompressing a compressed digital video to generate a decompressed digital video. In particular, the decompressed video generator 502 can identify a format of the compressed digital video and/or compression algorithm used in creating the compressed digital video and apply a corresponding decompression algorithm or decoding algorithm to the compressed digital video to reconstruct the original digital video prior to generation of the compressed digital video. In one or more embodiments, the decompressed video generator 502 decompresses the compressed digital video based at least in part on reference frames and corresponding motion data (e.g., motion vector data, camera movement data) included within the compressed digital video.

As further shown, the decoder application 202 may additionally include a motion data extractor 504 for identifying motion data from the compressed digital video. In particular, the motion data extractor 504 can extract or otherwise identify motion data relied on when generating the decompressed digital video. For example, the motion data extractor 504 may include an application or instructions for extracting motion vectors, camera movement data, or other motion data from the compressed digital video while the decompressed video generator 502 is performing the process of reconstructing the original digital video based data included within the compressed digital video.

In addition to generally identifying the motion data, the motion data extractor 504 can additionally map the specific motion data to corresponding portions of the decompressed digital video. For example, the motion data extractor 504 can identify motion data corresponding to and mapped to individual digital images that make up the decompressed digital video. As another example, the motion data extractor 504 can identify motion data corresponding to and mapped to discrete pixels or portions of pixels that make up individual digital images or clips of the digital video including multiple digital image frames.

As further shown in FIG. 5, the pixel selection system 108 includes a pixel selection manager 204, which may include a motion data analyzer 506 for analyzing the motion data identified from the compressed digital video. In one or more embodiments, the motion data analyzer 506 analyzes the extracted motion data by applying various criteria or parameters to the motion data to determine portions of the digital video for which movement of content is present. For instance, the motion data analyzer 506 can analyze the motion data to identify scenes of the decompressed digital video. As another example, the motion data analyzer 506 can analyze motion data to identify select portions of images of clips in which motion data is present. In other examples, the motion data analyzer 506 can characterize detected motion as a scene change, movement of an object, panning of a camera, or any other content of interest, which may be defined differently depending on an application or training of the image processing model 104.

The pixel selection manager 204 may additionally include a pixel subset identifier 508 for identifying a subset of pixel data from the decompressed digital video based on the motion data. In particular, the pixel subset identifier 508 may identify pixel data including image frames, portions of image frames, or select portions of clips/scenes from the decompressed digital video based on the analysis of the motion data and in accordance with an application or training of the image processing model 104. In accordance with various examples discussed above, the pixel subset identifier 508 can selectively identify a subset of pixel data from a collection of pixels representative of the decompressed digital video by identifying select image frames (e.g., at a corresponding frame rate), identifying select pixels or images from one or more detected scenes, and/or identifying select regions or portions of pixels from respective images. In each of these examples, the pixel subset identifier 508 can identify the subset of pixels based on motion data corresponding to the identified subset of pixels.

As shown in FIG. 5, the pixel selection system 108 may include a data storage 510, which may include compression data 512 stored thereon. The compression data may include information about different formats of digital videos, a variety of compression algorithms, and any number of decompression algorithms that may be used in the process of decompressing a compressed digital video in accordance with one or more embodiments described herein. For example, the decompressed video generator 502 may identify a decompression algorithm from the compression data 512 for use in decompressing a compressed digital video having a particular format.

As further shown, the data storage may include model data 514. The model data 514 may include any information about an image processing model including one or more applications and/or functions that the image processing model is trained to perform. The model data 514 may include information used by the pixel selection manager 204 in analyzing the motion data and identifying a subset of pixels to provide as input to the image processing model 104. The model data 514 may additionally include information about whether the image processing model 104 is trained to generate an output based on input motion data in addition to various types of pixel data.

Each of the components of the computing device 106 may be in communication with one another using any suitable communication technologies. In addition, while the components of the computing device 106 are shown to be separate in FIG. 5, any of the components or subcomponents may be combined into fewer components, such as into a single component, or divided into more components as may serve a particular implementation.

The components of the computing device 106 may include software, hardware, or both. For example, the components of the computing device 106 shown in FIG. 5 may include one or more instructions stored on a computer-readable storage medium and executable by processors of one or more computing devices. When executed by the one or more processors, the computer-executable instructions of the computing device 106 can perform one or more methods described herein. Alternatively, the components of the computing device 106 can comprise hardware, such as a special purpose processing device to perform a certain function or group of functions. Additionally, or alternatively, the components of the computing device 106 may include a combination of computer-executable instructions and hardware.

Figure 6:
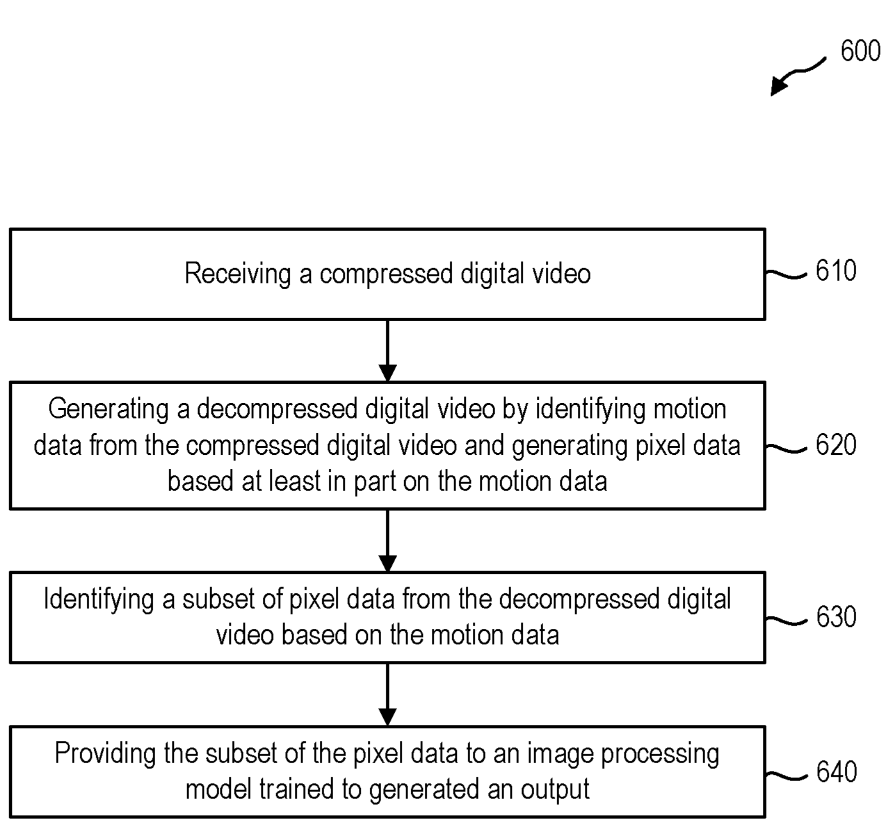
FIG. 6 illustrates an example method of selectively providing pixel data to an image processing model in accordance with one or more implementations.
Figure 7:
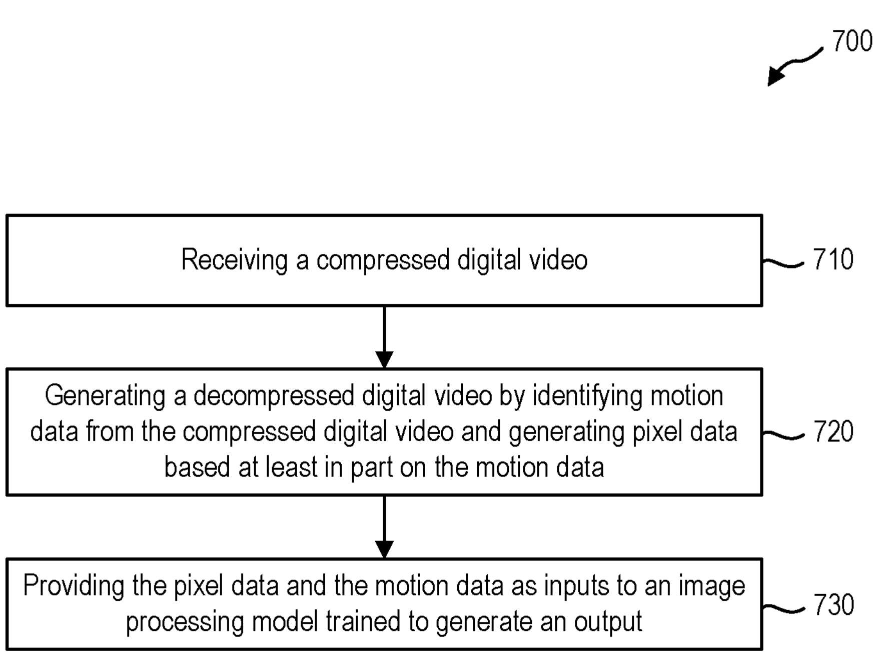
FIG. 7 illustrates an example method of selectively providing pixel data and motion data to an image processing model in accordance with one or more implementations.

Turning now to FIGS. 6-7, these figures illustrate example flowcharts including series of acts for selectively identifying pixel data and/or motion data to provide as input to an image processing model. While FIGS. 6-7 illustrate acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device to perform the acts of FIGS. 6-7. In still further embodiments, a system can perform the acts of FIGS. 6-7.

As shown in FIG. 6, a series of acts 600 may include an act 610 of receiving a compressed digital video. As further shown, the series of acts 600 may include an act 620 of generating a decompressed digital video by identifying motion data from the compressed digital video and generating pixel data based at least in part on the motion data. For example, the act 620 may include decompressing the compressed digital video to generate a decompressed digital video having a plurality of digital images where decompressing the compressed digital video includes identifying motion data from the compressed digital video and generating pixel data for the plurality of digital images based at least in part on the motion data.

The motion data may include motion vector data extracted from the compressed digital video while decompressing the compressed digital video. The motion vector data may be associated with localized movement of content represented by the pixel data between subsequent digital images of the plurality of digital images. The motion data may further include camera movement data extracted from the compressed digital video while decompressing the compressed digital video. The camera movement data may be associated with global movement of content represented by the pixel data between subsequent digital images of the plurality of digital images.

The series of acts 600 may also include an act 630 of identifying a subset of pixel data from the decompressed digital video based on the motion data. Identifying the subset of the pixel data may include identifying a subset of digital images from the plurality of digital images based on motion data corresponding to the identified subset of digital images.

As further shown in FIG. 6, the series of acts 600 may include providing the subset of the pixel data to an image processing model trained to generate an output. For example, the act 640 may include providing the subset of the pixel data as input to an image processing model trained to generate an output based on input pixel data. Where the subset of pixel data includes a subset of images, providing the subset of the pixel data may include providing the subset of digital images as input to the image processing model.

In one or more implementations, identifying the subset of the pixel data includes selectively identifying digital images from the plurality of digital images at a first frame rate less than a second frame rate of the plurality of digital images. The series of acts 600 may further include determining the first frame rate based on a rate at which the image processing model is configured to process incoming digital images.

In one or more implementations, identifying the subset of the pixel data may include identifying portions of digital images from the plurality of digital images based on motion data identified for the plurality of digital images. In addition, providing the subset of the pixel data as input to the image processing model may include providing the identified portions of the digital images as input to the image processing model without providing pixel data for one or more additional portions of the digital images as input to the image processing model.

In one or more implementations, the series of acts 600 includes identifying a scene change within the decompressed digital video based on the motion data. The series of acts 600 further include providing the subset of pixel data as input to the image processing model in response to identifying the scene change. The image processing model may include a deep learning model trained based on input digital images for a plurality of input digital videos and associated motion data for the input digital images. The image processing model may further be implemented on one or more of a cloud computing system or a computing device that received the compressed digital video and generated the decompressed digital video.

In one or more embodiments, the image processing model includes a deep learning model implemented on a cloud computing system. In one or more implementations, the image processing model includes a deep learning model implemented on a computing device that receives the compressed digital video and decompresses the compressed digital video to generate the decompressed digital video.

As shown in FIG. 7, a series of acts 700 may include an act 710 of receiving a compressed digital video. As further shown, the series of acts 700 may include an act 720 of generating a decompressed digital video by identifying motion data from the compressed digital video and generating pixel data based at least in part on the motion data. For example, the act 720 may include decompressing the compressed digital video to generate a decompressed digital video including a plurality of digital images where decompressing the compressed digital video includes identifying motion data from the compressed digital video and generating pixel data for the plurality of digital images based at least in part on the motion data.

As further shown, the series of acts 700 may include an act 730 of providing the pixel data and the motion data as inputs to an image processing model trained to generate an output. For instance, the act 730 may include providing the pixel data and the motion data as inputs to an image processing model trained to generate an output based on input pixel data.

The series of acts 700 may further include identifying a plurality of scenes of the decompressed digital video corresponding to a plurality of segments of the decompressed digital video based on motion data from the identified motion data corresponding to each segment from the plurality of segments of the decompressed digital video. Identifying the plurality of scenes may include identifying discontinuities in the motion data between the plurality of segments of the decompressed digital video.

In addition, providing the pixel data as input to the image processing model may include providing pixel data for a first scene from the plurality of scenes at a first frame rate. Providing the pixel data as input may additionally include providing pixel data for a second scene from the plurality of scenes at a second frame rate lower than the first frame rate based on a difference between motion data associated with the first scene and motion data associated with the second scene. The series of acts 700 may also include determining the first frame rate and the second frame rate based on motion data associated with the first scene and the second scene where the motion data indicates a higher metric of movement of content displayed within digital images of the first scene than a corresponding metric of movement of content displayed within digital images of the second scene.

Figure 8:
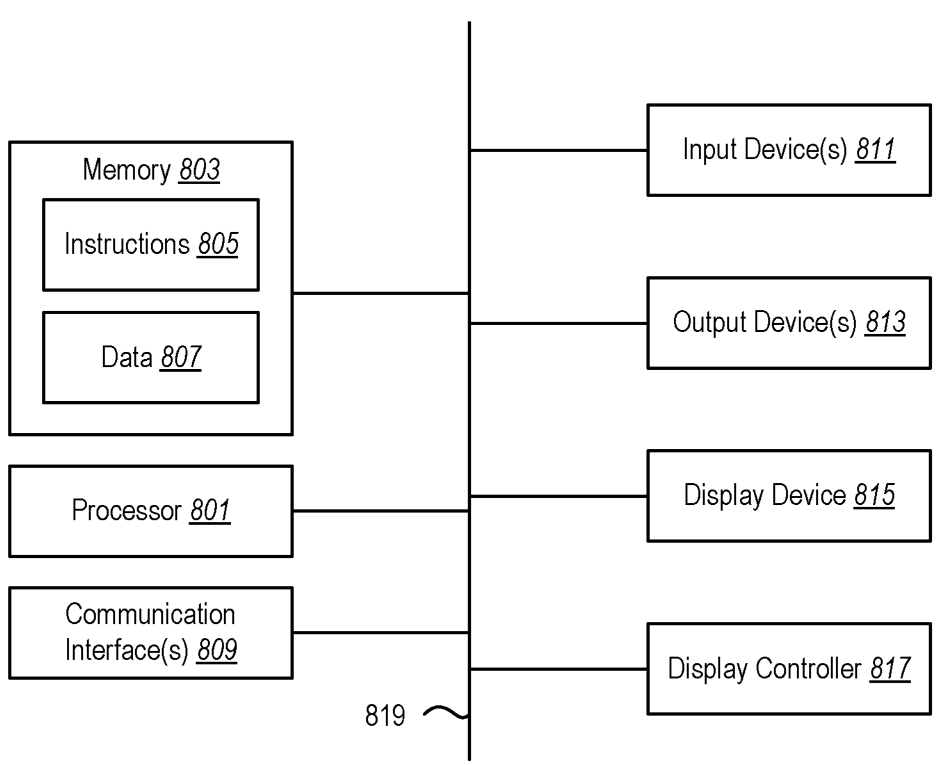
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

generating decompressed digital video including a plurality of frames by decompressing compressed digital video, wherein the decompressing the compressed digital video comprises:

identifying motion data from the compressed digital video; and generating pixel data indicating motion of content within respective frames of the plurality of frames based at least in part on the motion data;

identifying, using at least some of the motion data, plural scenes of the decompressed digital video corresponding to plural segments of frames among the plurality of frames;

selecting, based at least in part on results of the identifying the plural scenes, which of the plurality of frames to provide to an image processing model; and providing, for the selected frames, the pixel data of the selected frames and at least some of the motion data as inputs to the image processing model, the image processing model having been trained to generate an output based on pixel data input and associated motion data input.

2. The method of claim 1, wherein the identifying the plural scenes is based on identified discontinuities in the motion data between the plural segments.

3. The method of claim 1, wherein the providing the pixel data as input to the image processing model comprises:

providing, as inputs to the image processing model, first frames of a first segment from the plural segments at a first frame rate; and providing, as inputs to the image processing model, second frames of a second segment from the plural segments at a second frame rate lower than the first frame rate based on a difference between first motion data associated with the first segment and second motion data associated with the second segment.

4. The method of claim 3, further comprising determining the first frame rate and the second frame rate based on the first motion data associated with the first segment and the second motion data associated with the second segment, the first motion data indicating a higher metric of movement of content displayed within the first frames of the first segment than a corresponding metric of movement of content displayed within the second frames of the second segment.

5. The method of claim 1, wherein the image processing model comprises a deep learning model trained based on input frames for a plurality of input digital videos and associated motion data for the input frames.

6. The method of claim 1, wherein the image processing model is implemented on one or more of a cloud computing system or a computing device that received the compressed digital video and generated the decompressed digital video.

7. The method of claim 1, wherein the image processing model is trained to generate an output including a reduced clip of digital video based on the pixel data input and the associated motion data input.

8. The method of claim 1, wherein the image processing model is trained to generate an output including digital video having metadata tagged to one or more locations within the digital video based on the pixel data input and the associated motion data input.

9. A system, comprising:

at least one processor;

memory in electronic communication with the at least one processor; and instructions stored in the memory, the instructions being executable by the at least one processor to:

generate decompressed digital video including a plurality of frames by decompressing compressed digital video, wherein the decompressing the compressed digital video comprises:

identifying motion data from the compressed digital video; and generating pixel data indicating motion of content within respective frames of the plurality of frames based at least in part on the motion data;

identify, using at least some of the motion data, plural scenes of the decompressed digital video corresponding to plural segments of frames among the plurality of frames;

select, based at least in part on results of the identifying the plural scenes, which of the plurality of frames to provide to an image processing model; and provide, for the selected frames, the pixel data of the selected frames and at least some of the motion data as inputs to the image processing model, the image processing model having been trained to generate an output based on pixel data input and associated motion data input.

10. The system of claim 9, wherein the identifying the plural scenes is based on identified discontinuities in the motion data between the plural segments.

11. The system of claim 9, wherein the providing the pixel data as input to the image processing model comprises:

providing, as inputs to the image processing model, first frames of a first segment from the plural segments at a first frame rate; and providing, as inputs to the image processing model, second frames of a second segment from the plural segments at a second frame rate lower than the first frame rate based on a difference between first motion data associated with the first segment and second motion data associated with the second segment.

12. The system of claim 11, further comprising instructions being executable by the at least one processor to determine the first frame rate and the second frame rate based on the first motion data associated with the first segment and the second motion data associated with the second segment, the first motion data indicating a higher metric of movement of content displayed within the first frames of the first segment than a corresponding metric of movement of content displayed within the second frames of the second segment.

13. The system of claim 9, wherein the image processing model comprises a deep learning model trained based on input frames for a plurality of input digital videos and associated motion data for the input frames.

14. The system of claim 9, wherein the image processing model is implemented on one or more of a cloud computing system or a computing device that received the compressed digital video and generated the decompressed digital video.

15. The system of claim 9, wherein the image processing model is trained to generate an output including a reduced clip of digital video based on the pixel data input and the associated motion data input.

16. The system of claim 9, wherein the image processing model is trained to generate an output including digital video having metadata tagged to one or more locations within the digital video based on the pixel data input and the associated motion data input.

17. A non-transitory computer readable medium storing instructions thereon that, when executed by at least one processor, cause a computing device to:

generate decompressed digital video including a plurality of frames by decompressing compressed digital video, wherein the decompressing the compressed digital video comprises:

identifying motion data from the compressed digital video; and generating pixel data indicating motion of content within respective frames of the plurality of frames based at least in part on the motion data;

identify, using at least some of the motion data, plural scenes of the decompressed digital video corresponding to plural segments of frames among the plurality of frames;

select, based at least in part on results of the identifying the plural scenes, which of the plurality of frames to provide to an image processing model; and provide, for the selected frames, the pixel data of the selected frames and at least some of the motion data as inputs to the image processing model, the image processing model having been trained to generate an output based on pixel data input and associated motion data input.

18. The non-transitory computer readable medium of claim 17, wherein the providing the pixel data as an input to the image processing model comprises:

providing, as inputs to the image processing model, first frames of a first segment from the plural segments at a first frame rate; and providing, as inputs to the image processing model, second frames of a second segment from the plural segments at a second frame rate lower than the first frame rate based on a difference between first motion data associated with the first segment and second motion data associated with the second segment.

19. The non-transitory computer readable medium of claim 18, further comprising instructions that, when executed by the at least one processor, cause the computing device to determine the first frame rate and the second frame rate based on the first motion data associated with the first segment and the second motion data associated with the second segment, the first motion data indicating a higher metric of movement of content displayed within the first frames of the first segment than a corresponding metric of movement of content displayed within the second frames of the second segment.

20. The non-transitory computer readable medium of claim 17, wherein the identifying the plural scenes is based on identified discontinuities in the motion data between the plural segments.

* * * * *